US008716367B2

(12) United States Patent
Daly et al.

(10) Patent No.: US 8,716,367 B2
(45) Date of Patent: May 6, 2014

(54) EPOXY FUNCTIONAL ACRYLIC COATING POWDERS AND POWDER COATINGS THEREFROM HAVING IMPROVED FILIFORM CORROSION RESISTANCE

(75) Inventors: Andrew T. Daly, Sinking Spring, PA (US); Sabine Molitor-Limberg, Eslohe (DE)

(73) Assignee: Akzo Nobel Coatings International B.V., Arnhem (NL)

( * ) Notice: Subject to any disclaimer, the term of this patent is extended or adjusted under 35 U.S.C. 154(b) by 741 days.

(21) Appl. No.: 12/152,301

(22) Filed: May 14, 2008

(65) Prior Publication Data

US 2009/0227708 A1 Sep. 10, 2009

Related U.S. Application Data

(60) Provisional application No. 61/068,037, filed on Mar. 4, 2008.

(51) Int. Cl.
*C09D 163/00* (2006.01)

(52) U.S. Cl.
USPC .......................................................... 523/400

(58) Field of Classification Search
USPC .......................................................... 523/400
See application file for complete search history.

(56) References Cited

U.S. PATENT DOCUMENTS

| | | | |
|---|---|---|---|
| 3,752,870 | A | 8/1973 | Labana |
| 3,998,768 | A | 12/1976 | Pettit, Jr. |
| 4,042,645 | A | 8/1977 | Hirota et al. |
| 4,286,021 | A | 8/1981 | Brendley, Jr. |
| 5,407,707 | A | 4/1995 | Simeone et al. |
| 5,407,747 | A | 4/1995 | Sammel et al. |
| 5,422,396 | A | 6/1995 | Daly et al. |
| 5,453,295 | A | 9/1995 | Sammel et al. |
| 5,521,250 | A * | 5/1996 | Wamprecht et al. .......... 525/130 |
| 5,663,240 | A | 9/1997 | Simeone et al. |
| 5,939,491 | A | 8/1999 | Wilt et al. |
| 6,013,733 | A | 1/2000 | Singer et al. |
| 6,022,927 | A | 2/2000 | Decker et al. |
| 6,025,030 | A | 2/2000 | Decker et al. |
| 6,046,276 | A | 4/2000 | Ambrose et al. |
| 6,069,221 | A | 5/2000 | Chasser et al. |
| 6,270,905 | B1 | 8/2001 | Swarup et al. |
| 6,274,672 | B1 | 8/2001 | Ambrose et al. |
| 6,316,119 | B1 | 11/2001 | Metzger et al. |
| 6,518,395 | B1 * | 2/2003 | Klostermann et al. ........ 528/501 |
| 6,613,840 | B2 * | 9/2003 | Itou et al. ..................... 525/131 |
| 6,828,363 | B2 * | 12/2004 | Beuermann et al. ............ 524/81 |
| 7,638,201 | B2 | 12/2009 | Cinoman et al. |
| 7,723,410 | B2 | 5/2010 | Daly et al. |
| 2003/0077469 | A1 | 4/2003 | Chasser et al. |
| 2004/0171757 | A1 * | 9/2004 | Moens et al. ................. 525/190 |
| 2007/0078235 | A1 | 4/2007 | Lu et al. |
| 2008/0233300 | A1 | 9/2008 | Cinoman et al. |
| 2009/0227752 | A1 | 9/2009 | Lu et al. |

FOREIGN PATENT DOCUMENTS

| | | |
|---|---|---|
| CN | 1280591 A | 1/2001 |
| CN | 1592772 A | 3/2005 |
| DE | 22 61 392 A1 | 6/1973 |
| JP | 2003-321643 A | 11/2003 |
| JP | 2007-84709 A | 4/2007 |
| JP | 2007-269844 A | 10/2007 |
| WO | WO 97/21740 A1 | 6/1997 |
| WO | WO 99/24493 * | 5/1999 |

OTHER PUBLICATIONS

Questel QPAT abstract for JP 2007-84709 A, dated Apr. 5, 2007.
Gelbard et al., "Polynitrogen strong bases as immobilized catalysts for the transesterification of vegetable oils," C. R. Acad. Sci. Paris Chemistry 3 (2000) pp. 563-567.
Schuchardt et al., "Transesterification of soybean oil catalyzed by polystyrenes," Journal of Molecular Catalysis A: Chemical 109 (1996) pp. 37-44.
European Search Report for Application No. EP 08 25 1401, dated Jul. 7, 2009.
European Office Action for Application No. 09 152 383.7, dated Oct. 12, 2009.
English translation of Japanese Office Action 2008-126066, dated Aug. 3, 2011 relating to U.S. Appl. No. 12/152,301.
English translation of JP 2003-321643 A, dated Nov. 14, 2003.
English translation of JP 2007-269844 A, dated Oct. 18, 2007.
English translation of Chinese Office Action 2008-10108733.1, dated Jan. 15, 2011, relating to U.S. Appl. No. 12/152,301.
English abstract of CN 1280591 A, dated Jan. 17, 2001.
English abstract of CN 1592772 A, dated Mar. 9, 2005.

* cited by examiner

*Primary Examiner* — Doris Lee
(74) *Attorney, Agent, or Firm* — James C. Abruzzo

(57) ABSTRACT

The present invention provides coating powders that enable improved filiform corrosion resistance in clear or tinted clear coating comprising an epoxy functional acrylic copolymer component having a $T_g$ of from 40° C. to 90° C. and chosen from a copolymer or copolymer mixture that comprises, based on the total weight of copolymerized monomers in the epoxy functional acrylic copolymer component, i) from 10 to 40 wt. % of one or more epoxy functional unsaturated monomer, e.g. glycidyl (meth)acrylate; ii) from 2.0 wt. % to 13 wt. %, preferably 12 wt. % or less, or, more preferably, 6 wt. % or less, of one or more hydrophobic acrylic monomer that has a mass solubility in water of 3.5 g/L or less and which would itself form a homopolymer having a glass transition temperature ($T_g$) of 50° C. to 175° C., e.g. a bicycloalkyl(meth) acrylate, and iii) the remainder of one or more nonionic comonomer that is not a hydrophobic acrylic monomer ii), e.g. methyl methacrylate; one or more crosslinker for the thermosetting acrylic copolymer; and, optionally, one or more adhesion promoter, e.g. epoxy resin, a light stabilizer, an ultraviolet (UV) absorber, and/or a hydrophobic submicron particle.

13 Claims, No Drawings

EPOXY FUNCTIONAL ACRYLIC COATING POWDERS AND POWDER COATINGS THEREFROM HAVING IMPROVED FILIFORM CORROSION RESISTANCE

This application claims priority to U.S. Provisional Application 61/068,037 filed Mar. 4, 2008.

The present invention relates to thermosetting epoxy functional acrylic copolymer coating powders comprising the copolymerization product of one or more hydrophobic acrylic monomer and one or more epoxy and to filiform corrosion resistant coatings made therefrom. More particularly, it relates to coating powders comprising an epoxy functional acrylic copolymer component which is an epoxy functional acrylic copolymer or a mixture of such a copolymer with one or more second copolymer, as well as to the filiform corrosion resistant coatings made therefrom, e.g. coated aluminum or forged alloy wheels.

The exposed portions of metal wheels on a speeding car are subjected to a fury of grit which abrades the protective coating. A hard and tough film is needed. The film should ideally be non-porous and should retain superior adhesion to the metal to prevent the spread of corrosion at the interface of the film and metal. However, the appearance of filiform corrosion precedes any evidence of degradation, e.g. visible pitting of the coating reaching down to the metal surface of the organic coating, is not necessary for the growth of filiform corrosion. For example, protective acrylic and polyester clear coat powder coatings have been used in comparable film thicknesses on aluminum wheels before this invention. Such coatings have been observed to fail to prevent filiform corrosion over time even though the coating itself had not suffered visually unacceptable degradation.

Currently, clear coats applied on aluminum wheels are applied over a non-chrome pretreatment, such as a single atom monolayer (SAM) pretreatment, which retains the bright color of the aluminum wheel. Such pre-treatments avoid highly toxic hexavalent chromium pretreatments; however, aluminum wheels and trim having epoxy functional acrylic clear coat powder coatings fail to give adequate filiform corrosion resistance on hexavalent chromium-free pretreated aluminum wheels and trim, resulting in unacceptable coating rejection rates. Such coatings do provide desired chemical resistance, scratch resistance and weatherability.

Polyester clear coat powder coatings on hexavalent chromium-free pre-treated aluminum wheels and trim provide adequate filiform corrosion resistance. However, polyester powder coatings must be overlaid with a liquid to provide adequate chemical resistance, scratch resistance and weatherability.

U.S. patent publication no. 2007/0078235 A1, to Lu et al., discloses coating powders comprising copolymers of glycidyl (meth)acrylate and caprolactone (meth)acrylate to provide improved compatibility, recoatability, flexibility and pigment dispersion in powder coatings. However, the Lu et al. publication fails to disclose coating powders that provide coatings having filiform corrosion resistance better than conventional epoxy functional acrylic clear coat powder coatings.

The present inventors seek to solve the problem of providing acrylic coating powders for making filiform corrosion resistant powder coatings for aluminum, forged alloy or metal substrates without impairing powder coating smoothness, clarity or coating powder stability, especially in powder coatings for aluminum or forged alloy wheels and automotive trim pretreated with hexavalent chromium-free pretreatments.

STATEMENT OF THE INVENTION

In accordance with the present invention, coating powders providing improved filiform corrosion resistance in clear coat or tinted clear coat powder coatings comprising an epoxy functional acrylic copolymer component that is an epoxy functional acrylic copolymer or a mixture of two or more copolymers, the epoxy functional acrylic copolymer component having a $T_g$ of from 40° C. to 90° C. and comprising, as copolymerized monomers, i) from 10 to 40 wt. % of one or more epoxy functional unsaturated monomer, e.g. glycidyl (meth)acrylate; ii) from 2.0 wt. % to 13 wt. %, or 12 wt. % or less, or, preferably, 8.0 wt. % or less, or, more preferably, 6.0 wt. % or less of one or more hydrophobic acrylic monomer that has a mass solubility in water of 3.5 g/L or less and which would itself form a homopolymer having a glass transition temperature ($T_g$) of 50° C. to 175° C., and iii) the remainder of one or more nonionic comonomer that differs from hydrophobic acrylic monomer ii), preferably a nonionic comonomer that has a mass solubility in water of 30 g/L or less ii), each monomer wt. % based on the total weight of copolymerized monomers in the epoxy functional acrylic copolymer component; and one or more crosslinker for the acrylic copolymer. Optionally, the coating powder further comprises one or more adjuvant chosen from a hydrophobic submicron particle, an adhesion promoter, a light stabilizer, and an ultraviolet (UV) absorber. Preferably, the epoxy functional acrylic copolymer component comprises 12 wt. % or less, or, preferably, 8.5 wt. % or less of a vinyl aromatic monomer iv), based on the total weight of copolymerized monomers in the epoxy functional acrylic copolymer component.

Preferably, hydrophobic acrylic monomer ii) comprises a bicycloalkyl(meth)acrylate, such as isobornyl(meth)acrylate or dicyclopentadienyl(meth)acrylate.

In another embodiment, the coating powders comprise an epoxy functional acrylic copolymer component that is a mixture of two or more copolymers, and the one or more crosslinker. The copolymer mixtures may comprise an epoxy functional acrylic copolymer and one or more second copolymer chosen from a second epoxy functional acrylic copolymer, the copolymerization product of one or more carboxylic acid functional monomer and one or more nonionic comonomer, the copolymerization product of one or more phosphorus acid functional monomer and one or more nonionic comonomer, and mixtures and combinations thereof.

The coating powder may additionally comprise one or more adhesion promoter, such as an epoxy resin.

Preferably, the second copolymer is substantially free from copolymerized hydrophobic acrylic monomer (ii); i.e. the hydrophobic acrylic monomer ii) comprises 2.0 wt. % or less, based on the total weight of copolymerized monomer in the copolymer.

Preferably, the epoxy functional acrylic copolymer component comprises a mixture of one or more epoxy functional acrylic copolymer which is substantially free from copolymerized vinyl aromatic monomer (iv), and one or more second copolymer that comprises the copolymerization product of 30 wt. % or less of one or more vinyl aromatic comonomer (iv), e.g. styrene or vinyl toluene, based on the total weight of copolymerized monomers in the second copolymer(s).

In another preferred embodiment, the epoxy functional acrylic copolymer component comprises an epoxy functional acrylic copolymer and one or more second epoxy functional acrylic copolymer that is substantially free from copolymerized hydrophobic acrylic monomer (ii), wherein the total amount of the copolymerized hydrophobic acrylic monomer (ii) ranges from 2.0 wt. % to 13 wt. %, based on the total weight of the copolymerized monomers in the epoxy functional acrylic copolymer component. More preferably, the second epoxy functional acrylic copolymer further comprises in copolymerized form up to 30 wt. %, one or more vinyl aromatic monomer iv), based on the total weight of the copolymerized monomers in the epoxy functional acrylic copolymer.

Preferably, the one or more crosslinker is an organic dicarboxylic acid or anhydride, or an adduct thereof with a polyester.

In addition, according to the present invention, powder coated metal, e.g. aluminum or forged alloy substrates, comprise a coating made from the coating powder of the present invention. Preferably, the aluminum or forged alloy substrate is cleaned and pre-treated, for example with zinc phosphate or iron phosphate pretreatments. Substrates may include, for example, aluminum wheels and automotive trim.

All phrases comprising parenthesis denote either or both of the included parenthetical matter and its absence. For example, the phrase "(co)polymer" includes, in the alternative, polymer, copolymer and mixtures thereof.

Unless otherwise noted, all processes refer to and all examples were performed under conditions of standard temperature and pressure (STP).

All ranges cited herein are inclusive and combinable. For example, if an ingredient may be present in amounts of 0.05 wt. % or more to 1.0 wt. %, and in amounts up to 0.5 wt. %, then that ingredient may be present in amounts of from 0.05 to 1.0 wt. %, from 0.5 to 1.0 wt. % or from 0.05 to 0.5 wt. %.

As used herein, the term "average particle size" shall mean, unless otherwise indicated, the particle diameter or the largest dimension of a particle in a distribution of particles as determined by laser light scattering using a Malvern Mastersizer™ 2000 instrument (Malvern Instruments Inc., Southboro, Mass.) per manufacturer's recommended procedures.

As used herein, the phrase "coating powder" refers to a powder coating composition and the phrase "powder coating" refers to a coating formed from a powder coating composition.

As used herein, the term "copolymer" shall mean any polymer made from two or more different monomers.

As used herein, unless otherwise indicated, the term "glass transition temperature" or "$T_g$" of any resin or (co)polymer is measured using differential scanning calorimetry (DSC) (rate of heating of 20° C. per minute), the $T_g$ being taken at the midpoint of the inflection. $T_g$ may alternatively be calculated as described by Fox in *Bull. Amer. Physics. Soc.*, 1, 3, page 123 (1956).

As used herein, the term "hybrid" of any (co)polymer or resin shall refer to adducts, grafts or block copolymers and compatible or compatibilized blends of such (co)polymers or resins, such as epoxy polyester hybrids.

As used herein, the term "mass solubility" refers to the calculated solubility in water of a given material determined using the Advanced Chemistry Development (ACD/Labs) Software V9.04 (©1994-2007 ACD/Labs), and is available in the Chemical Abstracts' Registry.

As used herein, the term "(meth)acrylate" refers to either acrylate or methacrylate and the term "(meth)acrylic" refers to either acrylic or methacrylic.

As used herein, unless otherwise indicated, the term "molecular weight" refers to the weight average molecular weight of a polymer as measured by gel permeation chromatography (GPC) calibrated with polystyrene standards.

As used herein, the term "nonionic comonomer" refers to monomers that do not have acidic groups or salts, basic groups or salts, polyahl groups (e.g. OH, SH, NH), or condensation crosslinking groups.

As used herein, the term "oligoorganosilicon" includes any number from 2 to 20 silicon containing units and the prefix "polyorganosilicon" includes more than 20 silicon containing units.

As used herein, the term "phosphorus acid group" refers to a phosphorus oxo acid having a POH moiety in which the hydrogen atom is ionizable. Also included in the term "phosphorus acid group" are salts of the phosphorus oxo acid, i.e. that have a cation such as a metal ion or an ammonium ion replacing at least one acid proton. Examples of phosphorus acid groups include groups formed from phosphinic acid, phosphonic acid, phosphoric acid, pyrophosphinic acid, pyrophosphoric acid, partial esters thereof, and salts thereof.

As used herein, the term "phr" means the amount, by weight, of an ingredient per hundred parts, by weight, of the resin system. The resin system includes resin or polymer and crosslinking or curing agent.

As used herein, the term "polymer" includes random, block, segmented and graft copolymers, and any mixture or combination thereof.

As used herein, the terms "resin" and "polymer" are interchangeable.

As used herein, the term "resin system" refers to the total of epoxy resin, toughening resin and any crosslinker, curing agent or hardener (but not catalyst) which becomes an integral part of the cross-linked structure.

As used herein, the term "substantially free from (a specified) copolymerized monomer" means that an acrylic copolymer comprises 2 wt. % or less of the copolymerized monomer specified, based on the total weight of copolymerized monomers.

As used herein, the term "wt. %" refers to weight %.

Herein, unless otherwise noted, all percentages are by weight.

The inventive coating powders provide clear or tinted powder coatings exhibiting excellent filiform corrosion resistance on aluminum or forged alloy substrates, such as automotive wheel substrates, while using conventional coating application techniques and while using conventional acrylic copolymer resins that have until now produced powder coatings with unacceptably large filiform corrosion failure rates. The coating powders enable superior filiform corrosion resistance even in coatings lacking an adhesion promoter. Accordingly, the coating powders of the present invention can greatly reduce the proportion of wheels and trim rejected by customers for filiform corrosion without substantially increasing the cost of the coating powder or of its use. In addition, the coating powders of the present invention provide corrosion resistant coatings on iron, steel, magnesium alloy and brass substrates.

The coating powders of the present invention comprise an epoxy functional acrylic copolymer component which is a copolymer or copolymer mixture that comprises, based on the total weight of copolymerized monomers in the epoxy functional acrylic copolymer component, i) from 10 to 40 wt. % of one or more epoxy functional unsaturated monomer, e.g. glycidyl (meth)acrylate; ii) from 2.0 wt. % to 13 wt. %, or 12 wt. % or less, or, preferably, 8.0 wt. % or less, or, more preferably, 6.0 wt. % or less, of one or more hydrophobic acrylic monomer that has a mass solubility in water of 3.5 g/L or less and which would itself form a homopolymer having a glass transition temperature ($T_g$) of 50° C. to 175° C., and iii) the remainder of one or more nonionic comonomer that differs from hydrophobic acrylic monomer ii). The epoxy functional acrylic copolymer component may additionally comprise copolymerized vinyl aromatic monomer iv) in the amount of 3 wt. % or more, or 12 wt. % or less or, preferably, 8.5 wt. % or less, based on the total weight of copolymerized monomers in the epoxy functional acrylic copolymer component.

To make copolymer components comprising mixtures, the copolymers may be mixed, for example, at any time after polymerization, or one copolymer may be copolymerized in the presence of an already formed copolymer.

Suitable second copolymers for admixture with the epoxy functional acrylic copolymer may be chosen epoxy functional acrylic copolymers, epoxy functional vinyl copolymers, carboxylic acid functional acrylic copolymers, carboxylic acid functional vinyl copolymers, phosphorus acid functional acrylic copolymers, phosphorus acid functional vinyl copolymers, and mixtures and combinations thereof. The amount of one or more second acrylic copolymer, based on the total weight of acrylic copolymers in the mixture, may range from 1 to 60 wt. %, preferably, 10 to 50 wt. %, or, more preferably, 40 wt. % or less.

In embodiments where the second acrylic copolymer comprises the copolymerization product of one or more carboxylic acid functional monomer and one or more comonomer, the carboxylic acid functional monomer may be used in amounts of up to 10 wt. %, or, 0.1 wt. % or more, preferably, or 5 wt. % or less, based on the total weight of copolymerized monomers in the copolymer.

In embodiments where the second acrylic copolymer comprises the copolymerization product of one or more phosphorus acid functional monomer and one or more comonomer, the phosphorus acid functional monomer may be used in amounts of up to 5 wt. %, or, 0.1 wt. % or more, preferably, or 3 wt. % or less, based on the total weight of copolymerized monomers in the copolymer.

In one embodiment, the epoxy functional acrylic copolymer component comprises a mixture of one or more epoxy functional acrylic copolymer with one or more second copolymer that is substantially free from copolymerized hydrophobic acrylic monomer ii). Preferably, the second copolymer comprises the copolymerization product of i) from 5 to 80 wt. %, based on the total weight of copolymerized monomers, of one or more epoxy functional unsaturated monomer, and one or more nonionic comonomer iii).

In another embodiment, the epoxy functional acrylic copolymer component comprises one or more epoxy functional acrylic copolymer that is substantially free from copolymerized vinyl aromatic monomer iv) and one or more second copolymer. Preferably, the second copolymer comprises from 2 to 30 wt. %, or 25 wt. % or less of copolymerized vinyl aromatic monomer iv), based on the total weight of copolymerized monomers in the second copolymer.

Other suitable polymer mixtures may include, for example, mixtures of one or more epoxy functional acrylic copolymer with a second copolymer chosen from an epoxy functional acrylic copolymer that is substantially free from copolymerized vinyl aromatic monomer iv), a carboxylic acid functional acrylic copolymer that is substantially free from copolymerized vinyl aromatic monomer iv), a phosphorus acid functional acrylic copolymer that is substantially free from copolymerized vinyl aromatic monomer iv), and mixtures thereof.

The acrylic copolymers are described in greater detail, as follows:

The epoxy functional acrylic copolymer or copolymer mixture comprises the copolymerization product of from 10 to 40 wt. % epoxy functional unsaturated monomer, based on the total weight of copolymerized monomers in the epoxy functional acrylic copolymer component. If the amount of the epoxy functional unsaturated monomer used is less than 10 wt. %, based on the total weight of copolymerized monomers, it does not measurably contribute to an improvement of solvent resistance and mechanical strength. On the other hand, if the amount exceeds 40% by weight, no additional improvement in corrosion resistance is obtained.

A preferred epoxy functional acrylic copolymer or copolymer mixture comprises the copolymerization reaction product of one or more epoxy functional monomer, and from 2.0 wt. % to 13 wt. %, or 12 wt. % or less, or, preferably, 8.0 wt. % or less, or, more preferably, 6.0 wt. % or less, based on the total weight of copolymerized monomers in the epoxy functional acrylic copolymer component of one or more hydrophobic acrylic monomer ii) that has a mass solubility in water of 3.5 g/L or less, preferably, 2.5 g/L or less, and which would itself form a homopolymer having a glass transition temperature ($T_g$) of 50° C. to 175° C., preferably, 65° C. or more, preferably, a bicycloalkyl (meth)acrylate. Retaining a suitable acrylic copolymer $T_g$ ensures adequate blocking resistance or package stability while retaining adequate flow and film-forming properties.

To insure proper filiform corrosion resistance, the amount of copolymerized vinyl aromatic comonomer (iv), such as, for example, styrene, vinyl toluene, α-methyl styrene and other α-alkyl substituted styrenes, in the epoxy functional acrylic copolymer component should range from 0 to 12 wt. %, preferably, 10 wt. % or less, or, more preferably, 8.5 wt. % or less, based on the total weight of copolymerized monomers in the epoxy functional acrylic copolymer component. Thus, a 50/50 w/w mixture of two acrylic copolymers may comprise an epoxy functional acrylic copolymer having 0 wt. % copolymerized styrene and a second copolymer having up to 24 wt. % styrene, based on the total weight of copolymerized monomers in the second copolymer.

Suitable epoxy functional unsaturated monomers i) for use in making any epoxy functional acrylic copolymer may include, for example, one or more glycidyl ester of α-β ethylenically unsaturated carboxylic acids, such as (meth)acrylic, maleic or itaconic acid, and allyl glycidyl ethers. Preferably, the epoxy functional monomer is chosen from glycidyl(meth)acrylate monomers of the formula $H_2C=C(R^8)C(O)OR^9$, wherein $R^8$ is H or a lower alkyl group and $R^9$ is a glycidyl terminal, branched or unbranched alkylene residue containing from 1 to 4 carbon atoms, i.e. the glycidyl ring lies at the end distal to the unsaturation. Illustrative compounds within the definition of formula (I) are glycidyl acrylate, glycidyl(meth)acrylate, and 1,2-epoxybutylacrylate, preferably, glycidyl(meth)acrylate of formula, wherein $R^8$ is methyl and $R^9$ is a glycidyl methylene group. Glycidyl(meth)acrylate monomers may comprise a mixture of monomers of formula I. Glycidyl(meth)acrylate, can be obtained commercially from Eastman Chemical Co. (Calvert City, Ky.) or the glycidyl(meth)acrylate monomer can be prepared under reaction conditions conventional to those of skill in the art.

Suitable hydrophobic acrylic monomers ii) may include, for example, one or more monomer chosen from isobornyl (meth)acrylate, dicyclopentadienyl(meth)acrylate, dihydrocyclopentadienyl(meth)acrylate, 2-ethylhexyl(meth)acrylate, cyclohexyl(meth)acrylate, benzyl(meth)acrylate, phenyl(meth)acrylate, and t-butyl(meth)acrylate. Such monomers improve the filiform corrosion resistance of weatherable coatings on aluminum, such as aluminum wheels. Preferably, the hydrophobic acrylic monomer is chosen from bicyclic cycloalkyl(meth)acrylates, such as dicyclopentadienyl(meth)acrylates and isobornyl(meth)acrylates.

Even in the amounts used in the acrylic copolymer of the present invention, such bicyclic monomers improve the flow of the acrylic copolymer and the compatibility of the acrylic copolymer containing them with other polymers and resins.

Suitable nonionic comonomers iii) may comprise one or more of any nonionic acrylic, vinyl or allyl monomer, such as, for example, one or more monomer chosen from alkyl(meth) acrylates, cycloalkyl(meth)acrylates, alkyl aryl(meth)acrylates vinyl esters, alkyl vinyl ethers, (meth)acrylonitriles, (meth)acrylamides, dialkyl esters of unsaturated dibasic acids, polyalkoxylated alkyl(meth)acrylates having from 1 to 20 alkoxy groups, and mixtures thereof. Unless otherwise indicated, nonionic comonomers include hydrophobic comonomers ii) and vinyl aromatic monomers (iv). Preferably, the nonionic comonomer has a mass solubility in water of 30 g/L or less, or, preferably, 25 g/L or less. Suitable examples of the comonomer may be chosen from $C_1$ to $C_{20}$ (cyclo)alkyl esters of (meth)acrylic acid, such as methyl (meth)acrylate, ethyl(meth)acrylate, n-butyl(meth)acrylate, isobutyl(meth)acrylate, 2-ethylhexyl(meth)acrylate, cyclohexyl acrylate, lauryl(meth)acrylate, stearyl(meth)acrylate, eicosyl(meth)acrylate and cetyl(meth)acrylate, as well as tridecyl(meth)acrylate, and mixtures thereof. Preferably, the comonomer comprises one or more $C_1$ to $C_8$ (cyclo)alkyl ester of (meth)acrylic acid, such as butyl(meth)acrylate and methyl methacrylate. Further by way of example, the vinyl monomers may be selected from styrene, α-methyl styrene, α-ethylstyrene, vinyl toluene, divinyl benzene, vinyl esters, e.g. vinyl acetates, vinyl ethers, allyl ethers, allyl alcohols, and mixtures thereof.

Suitable carboxylic acid functional acrylic copolymers for use in the epoxy functional acrylic copolymer component may comprise any copolymer having a weight average molecular weight of between about 1000 and about 30,000, and a carboxylic acid equivalent weight of from about 300 to about 1000, preferably at least about 500, the copolymerization product of from 2.5 to 25 wt. %, based on the total weight of copolymerized monomers, of one or more α-β ethylenically unsaturated carboxylic acid, and one or more nonionic comonomer. Examples of suitable carboxylic acid functional acrylic copolymers are Joncryl 819 and Joncryl 821 from BASF Corporation, Wyandotte, Mich.

Suitable α-β ethylenically unsaturated carboxylic acid monomers for making the carboxylic acid functional acrylic copolymer may include, for example, acrylic acid, methacrylic acid, acryloxypropionic acid, crotonic acid, fumaric acid, monoalkyl esters of fumaric acid, maleic acid, monoalkyl esters of maleic acid, itaconic acid, monoalkyl esters of itaconic acid and mixtures thereof.

Phosphorus acid functional acrylic copolymers suitable for use in the epoxy functional acrylic copolymer component may comprise the copolymerization product of i) from 0.5 to 10 wt. %, preferably, 1 to 5 wt. %, based on the total weight of copolymerized monomers, of one or more phosphorus acid monomer, and one or more nonionic comonomer. The phosphorus acid functional acrylic copolymer may further comprise the copolymerization product of up to 10 wt. %, preferably, from 1 to 5 wt. %, based on the total weight of copolymerized monomers, of one or more α-β ethylenically unsaturated carboxylic acid. The acrylic copolymer may comprise mixtures of one or more phosphorus acid functional acrylic copolymer and one or more epoxy functional acrylic copolymer.

Suitable phosphorus acid monomers for making the phosphorus acid functional acrylic copolymer can be any α-β ethylenically unsaturated monomer having a phosphorus acid group and may be in the acid form or as the salt of the phosphorus acid group. Phosphorus acid monomers may include, for example, phosphoalkyl(meth)acrylates such as phosphoethyl(meth)acrylate, phosphopropyl(meth)acrylate, and phosphobutyl(meth)acrylate; phosphoalkyl crotonates, phosphoalkyl maleates, phosphoalkyl fumarates, phosphodialkyl(meth)acrylates, phosphodialkyl crotonates, vinyl phosphates, and (meth)allyl phosphate. Preferred are phosphoalkyl methacrylates. Other suitable phosphorus acid monomers may include dihydrogen phosphate-functional monomers such as allyl phosphate, mono- or diphosphate of bis(hydroxy-methyl)fumarate or itaconate; phosphonate functional monomers, including, for example, vinyl phosphonic acid, allyl phosphonic acid, 2-acrylamido-2-methylpropanephosphonic acid, α-phosphonostyrene, 2-methylacrylamido-2-methylpropanephosphonic acid; 1,2-ethylenically unsaturated (hydroxy)phosphinylalkyl(meth) acrylate monomers; and oligomeric phosphorus acid monomers, such as diphosphomonoalkyl(meth)acrylates, i.e. (meth)acryloyloxyalkyl diphosphate, triphosphomonoalkyl (meth)acrylates, and metaphosphomonoalkyl (meth)acrylates and polyphosphomonoalkyl(meth)acrylates.

Suitable phosphorus acid functional acrylic copolymers may be prepared by first preparing a precursor polymer which contains a pendant first co-reactive epoxy group which can be reacted with a compound containing a second co-reactive group and a phosphorus acid group. For example one can prepare a precursor polymer using glycidyl(meth)acrylate. Suitable second co-reactive groups on the compound including a second co-reactive group and phosphorus acid group are amine, hydroxyl, and phosphoric acid anhydride. An epoxy functional precursor polymer can be reacted with polyphosphoric acid, or glyphosate to generate a phosphorus acid functional acrylic copolymer with internal pendant phosphorus acid groups.

Any suitable acrylic copolymers may be formed by conventional polymerization methods in the presence of a thermal or redox initiator. Organic solvent polymerization may be performed in the case of epoxy functional acrylic copolymers. In other cases, aqueous emulsion polymerization may be performed.

The copolymer coating powders according to the present invention also comprise one or more crosslinker, preferably a flexibilizing crosslinker. The crosslinker is added in a stoichiometry of 0.7 to 1.3:1 acid to epoxy in the acrylic copolymer, preferably 0.95 to 1.05:1; and suitable amounts of crosslinker may range from 5 to 35 wt. %, based on the total weight of the coating powder. Suitable crosslinkers may include any that react with epoxy groups without causing yellowing in the product coating, e.g. di- or polyacids, anhydrides or dianhydrides. Preferred crosslinkers may include organic dicarboxylic acids and their anhydrides, such as sebacic acid and dodecanedioic acid, and adducts made from esterification of organic dicarboxylic acids or anhydrides with polyesters or polyols. The crosslinker can help to improve the chip resistance of coatings made from the coating powder.

The coating powder may additionally comprise one or more adhesion promoter comprising any epoxy resin or isocyanate compound or prepolymer having a $T_g$ of 46° C. or higher, such as, for example, epoxy resins, epoxy-phenolic novolak resins, dimers and trimers of isophorone diisocyanate (IPDI), hexamethylene diisocyanate (HMDI) or toluene diisocyanate, blocked isocyanates, such as caprolactam blocked IPDI, and isocyanate terminated prepolymers of diisocyanates or their dimers or trimers with a polyol or glycol. Preferred adhesion promoters are bisphenol epoxy resins, more preferably bisphenol A or bisphenol F epoxy resins. Suitable amounts of adhesion promoter may range up to 10 wt. %, based on the total weight of the coating powder, preferably from 0.2 to 3 wt. %, or, more preferably, up to 1 wt. %. Amounts of greater than 3 wt. % can contribute to weatherability problems.

To aid in filiform corrosion resistance, the coating powder may further comprise up to 1.5 wt. %, based on the total weight of the coating powder of one or more hydrophobic submicron particle, such as an inorganic oxide, e.g. a metal oxide or silica, and an organosilicon compound, e.g. polydimethyl siloxane (PDMS) treated fume silica.

Hydrolyzable silanes, e.g. alkoxysilanes, may be used in the amount of from 0.01 to 3 wt. %, preferably, 0.3 wt. % or less, based on the total weight of the coating powder to couple fillers and inorganic oxide pigments into the coating matrix. Examples of suitable silanes include glycidyl alkoxy silanes and amino alkoxy silanes, such as glycidyl trimethoxy silane.

The coating powder compositions further comprise one or more light stabilizer or ultraviolet (UV) absorber to aid in weatherability. Such a light stabilizer or UV light absorber may be used in amounts of from 0.1 to 15 phr, preferably up to 5 phr. Suitable light stabilizers include, for example, hindered amines, such as poly(alkanoyl piperidine alcohols), e.g. oligomers of dimethyl succinate with 4-hydroxy tetramethyl piperidine ethanol, hindered phenols, or combinations thereof; suitable UV light absorbers include, for example, benzotriazoles, oxalic acid diarylamides, and 2-hydroxy benzophenone.

Small amounts, e.g. up to 0.10 wt. %, based on the total weight of the coating powder, preferably, up to 0.05 wt. %, of organic pigments, such as phthalo-cyanines may be included to control yellowing. The coating powder may additionally comprise any of from 0.001 to 1.0 wt. %, based on the total weight of the coating powder, of optical brighteners and/or leveling agents; from 0.1 to 10 phr, based on the total weight of the coating powder, of one or more flatting agent, such as alkyl(meth)acrylate copolymers, up to 6 phr of one or more wax; and from 0.01 to 1.0 wt. %, based on the total weight of the coating powder, of post blend additives, such as dry flow aids like silica and fume alumina.

Coating powders of the present invention are produced according to conventional methods. The components may be blended, and then intimately mixed, such as, for example, by melt-compounding so that no significant curing occurs. The molten compound may be extruded, and after extrusion, rapidly cooled, followed by grinding and, as necessary, sorting the particulates according to size. Alternatively, the coating powders may be produced by bonding particles comprising acrylic copolymer with the hydrophobic submicron particle to form agglomerate particles.

The coating powders may be applied via conventional means. For electrostatic coating, the average size of the particles may range from 5 to 200 μm, preferably 25 μm or more, or, 75 μm or less.

Once applied the coatings are cured thermally, for example, at temperatures of from 90 to 250° C. for a period of from 30 seconds to 90 minutes. Heat for thermal cure may come from a convection, infrared (IR) or near IR source.

Suitable substrates may include, for example aluminum, forged alloys, iron, steel, magnesium alloy, such as electronic goods and brass, such as lock and door hardware. Aluminum substrates may include, for example, aluminum silicon alloys, aluminum lithium alloys, aluminum magnesium, aluminum zinc, aluminum manganese, aluminum copper base alloys such as aluminum bronze, and the like. The alloys may be single, binary, or have more than two metals.

Preferably, the substrates are pretreated. Aluminum and forged alloy substrates may be pretreated with, for example, a self-assembled monolayer of phosphorus organic material; zirconium titanates or acrylic modified zirconium titanate. Steel and iron substrates may be pretreated with passivating agents, such as zinc phosphate or iron phosphate.

The following examples illustrate the utility of the present invention.

EXAMPLES

Test Methodology

Film Thickness:

Dry film thickness was measured using a POSITECTOR™ Model 6000-FN1 Coating Thickness Gauge from DeFelsko Corporation, Ogdensburg, N.Y., the film thickness was measured according ASTM D 1400-00 "Standard Test Method for Nondestructive Measurement of Dry Film Thickness of Nonconductive Coatings Applied to a Nonferrous Metal Base", 2000. Film thickness is reported as the range (low to high) of three readings measured in the center portion of the panel.

Methyl Ethyl Ketone (MEK) Rub Resistance:

A cotton-tipped applicator is saturated with MEK and rubbed a total of 50 double rubs back and forth across the surface of a test coating using approximately 2.6 cm strokes and 2-2.5 Kg of application pressure. One back and forth motion equals one double rub. The applicator is saturated with MEK throughout the 50 double rubs. Coatings exhibiting MEK resistance ratings from 4-5 have acceptable cure, physical properties and solvent resistance. The test panels are rated in, as follows:

TABLE 1

MEK Rating Chart

| MEK Rub Resistance Rating | Rub-Off | Indication of Chemical Resistance | Comments |
|---|---|---|---|
| 5 | None | Excellent | No rub-off of coating pigmentation; no softening or dulling of coating surface |
| 4 | Slight | Very Good | Slight rub-off of coating or pigmentation |
| 3 | Moderate | Fair to Good | Moderate rub-off of coating or pigmentation |
| 2 | Heavy | Poor to Fair | Heavy rub-off of coating or pigmentation |
| 1 | Extreme | Very Poor to None | Extreme rub-off of coating or pigmentation, or complete rub through coating to substrate |

Crack Crazing Resistance:

To determine the relative resistance to crazing of a clear powder coating when exposed to isopropyl alcohol, the powder coated substrates were bent over a 165 degree mandrel. The resulting panels have a 30 to 45 degree bend from horizontal and isopropyl alcohol is applied on the coating at point of maximum curvature. Immediately thereafter, the treated area was observed for the formation of cracks. The point of reference for observing cracks was perpendicular to axis. One minute after the isopropyl alcohol is applied, the degree of cracking is visually observed and reported.

Crosshatch Adhesion:

Coatings were tested in accordance with the adhesion test method published by the American Society For Testing And Materials (ASTM) using the method D3359-02, "Standard Test Methods for Measuring Adhesion by Tape Test", Test Method B—Cross-Cut Tape Test (2002). This method provides for cutting through the film in a crosshatch pattern of specified spacing, and taping the cut area with Permacel #99 tape, and then rapidly removing the tape. The cut area is then inspected to determine if paint has been loosed or removed, and the area is given a rating.

A rating of 5B is a perfect rating, requiring that none of the coating be removed. A rating of 0B would indicate that 65% or more of the coating was removed, thereby showing poor adhesion of the coating to the substrate. The Minimum acceptable adhesion rating is 3B.

Chemical Testing: Reference Fuel B and Washer Fluid:

On coated panels at room temperature, a cotton pad with the respective solvent(s) is placed on the surface for a specified time period with a crucible on top to hinder the evaporation rate. For the Reference Fuel B (70% isooctane and 30% toluene) Test, the cotton pad is placed on the substrate for 1 hour and is washed with DI water and dried with a paper towel. For the Washer Fluid Test (part. No. 8710320, Volvo original), a mixture of 50% methyl acetate and 50% ethanol on the cotton pad is placed on the substrate for 2 hours and is washed with DI water and dried with a paper towel. Evaluation takes place 24 hours after end of test. The surface of the coating film is evaluated for swelling on a rating from 0 to 3, with "0" being no indication of swelling and "3" being heavy swelling and evaluated for discoloration from 0 to 3, with "0" being no discoloration and "3" being heavy discoloration of the paint film. A "pass" means no changes in surface or softening. The coating is then subjected to an adhesion test. To pass the test, it should not be possible to remove the coating of the surface under test by scraping with the nail.

Copper Accelerated Acetic Acid Salt Spray (CASS) DIN ISO EN 9227 (October 2006):

Corrosion resistance testing of powder coatings applied to the substrates and at the thicknesses shown in Tables 3, 4 and 5, below, was conducted by cutting, in wheel sections, two scribes per section (min 100 mm scribe length), at a min. distance of 20 mm from each other with and 1 mm scribe width, with a Sikkens 1 mm/Erichsen model 463 manual scribe tool, through the coating down to the metal substrate (Erichsen, Hemer, Germany), and placing maximum of 20 of wheel sections specimens in an accelerated salt spray chamber (Weiss Umwelttechnik GmbH, Reiskirchen, Germany Type SC 1000 salt spray tester) equipped with a filtered air pressurized atomizer having an acrylic glass nozzle and a deionized (DI) water saturation tower and adjusted to collect 1.5 ml/h±0.5 ml/h of, per each 80 cm$^2$ area of the substrate wheel section, a solution of 50±5 g/l sodium chloride (NaCl) and 0.26±0.02 g/l copper (II) chloride dihydrate ($CuCl_2.2H_2O$) in DI water having a pH of from 3.1 to 3.3 (VIN 50021 CASS solution) at a temperature of 50° C.±2° C. for a period of 24 hours. The lengths of all of the filaments on each specimen are measured with a metric ruler and the average creepage (length of the filaments) and the maximum creepage (longest filament length) is reported in Tables 4 and 5, below.

Daimler DC Filiform Corrosion Resistance PPAP3002 (TA762) Procedure:

To measure filiform corrosion resistance in coated wheel sections, the DIN ISO EN 9227 CASS procedure was followed, with no rinse. The resulting specimens were then placed directly into 82% RH at 60° C. for 672 hours. The lengths of all of the filaments on each specimen are measured with a metric ruler and the average creepage (length of the filaments) and the maximum creepage (longest filament length) is reported in Tables 3, below.

Chip Resistance Before/after CASS:

(DIN 55996-1B, April, 2001) Both before and after CASS testing, the coated substrates were shot with 4-5 mm steel grit acc. DIN EN ISO 11124-2 (2002) in an Erichsen Model 508 stone chip tester, (Erichsen, Hemer, Germany). The reported K values range from 0.5 to 5, in one-half point increments, and represent the degree of chipping and the % of damaged area, evaluated by comparison with ten (10) "K" reference photos in the DIN 55996-1 publication. K values relate to the proportion of surface area damaged. A lower K value is better: A K value of 2.0 or better passes the test.

Appearance/Smoothness:

This was rated by comparing the coatings with Powder Coatings Institute (PCI) standard panels, a score of 1 (poor) is rated as heavy orange peel and a 10 is the smoothest rating.

QUV-B:

The initial gloss and color (calorimetric) of each coated panel was determined and then the panels were exposed to radiation at a mean wavelength of 313 nm for 3000 hours in a UV-B tester made by Pausch Messtechnik GmbH (Haan, Germany), followed by determination of final gloss and color change ($\Delta e$).

Examples 1 to 5

Formulation and Application

Coating powders were formed from the ingredients of Example 2 listed in the following Table 1 according to a method wherein the raw ingredients were blended in a Prism mixer for 30 seconds@2100 RPM, then extruded in a ZSK30 (Coperion Werner & Pfleiderer, Stuttgart, Germany) at 400 rpm, 15-30% torque and 90-130° C. barrel temperature setting. The resulting molten extruded mixture was fed through cooled chill-rolls to form a solid sheet that was subsequently granulated into chip form. Dry flow additives were mixed with the chips by bag shaking for 0.25-0.5 min. The post blend treated chips were then ground to a fine powder in a ZM 100 lab mill (Retsch, Wuppertal-Haan, DE) at 18.000 rpm using a 0.5 mm screen size screen. The resulting ground powder was screened through a 125 μm mesh size sieve, and was then applied to the indicated substrate using a Nordson Versa-spray™ electrostatic spray gun (Nordson Corp., Amherst, Ohio) to the indicated thickness and was then cured at 175° C. for 20 min in electric heated lab oven to form powder coatings.

The coating powders of Examples 1, 3, 4 and 5 were formed by simple melt mixing of the ingredients listed in the in a ZSK25 (Coperion Werner & Pfleiderer, Stuttgart, Germany) at 500 rpm, 15-30% torque and 90-130° C. barrel temperature setting. The resulting molten extruded mixture was fed through cooled chill-rolls to form a solid sheet that was subsequently granulated into chip form. Post blend (dry flow) additives were mixed with the chips by bag-shaking for 0.25-0.5 min. The post blend treated chips were then ground to a fine powder in a ZM 100 lab mill (Retsch, Wuppertal-Haan, DE) at 18.000 rpm using a 0.5 mm screen size screen. The resulting ground powder was screened through a 125 μm mesh size sieve for subsequent application to form coatings and was applied to the indicated substrate with a GEMA Optiflex-Optistar CG07 (St. Gallen, Switzerland) electrostatic spray gun to the indicated thickness and was then cured at 175° C. for 20 min in electric heated lab oven Heraeus UT60-6120 (Hanau, Germany).

TABLE 2

Formulations

| Raw Material | 1 COMP | 2 | 3 | 4 | 5 |
|---|---|---|---|---|---|
| | | EXAMPLE | | | |
| | | Amount (parts by weight) | | | |
| Second Copolymer 24 wt. % GMA; 40 wt. % MMA; 23 wt. % BMA; 13 wt. % Styrene | 2250 | 825 | 825 | — | — |
| Epoxy Functional Acrylic Copolymer 28 wt. % GMA; 12 wt. % IBOMA; 34 wt. % MMA; 22 wt. % nBMA; 4 wt. % Styrene | — | — | 825 | 1625 | 1625 |
| Epoxy Functional Acrylic Copolymer 28 wt. % GMA; 47 wt. % MMA; 8 wt. % nBMA; 6 wt. % IBOMA; 11 wt. % Styrene | — | 800 | — | — | — |
| Second Copolymer 23 wt. % GMA; 38 wt. % MMA; 11 wt. % nBA; 28 wt. % Styrene | 750 | — | — | — | — |
| Sebacic Acid | 552.5 | 310 | 552.5 | 552.5 | 552.5 |
| [3]Acrylate copolymer flow modifier | 30 | 18 | 30 | 30 | 30 |
| [1]Benzoin | 15 | 10 | 15 | 15 | 15 |
| Dioxazine violet | 0.0018 | 0.0018 | 0.0018 | 0.0018 | 0.0018 |
| [4]Benzotriazole | 15 | 14 | 15 | 15 | 15 |
| Polyester of dimethyl succinate with 4-hydroxy tetramethyl piperidine ethanol | 15 | 14 | 15 | 15 | 15 |
| [2]Aerosil ™ R-972 | — | 4 | 4 | 4 | 4 |
| [5]Bisphenol A epoxy | — | — | — | — | 30 |
| Glycidyl trimethoxy silane | 6 | 6 | 6 | 6 | 6 |
| Fumed aluminum oxide - Dry Flow | 0.20% | 0.20% | 0.20% | 0.20% | 0.20% |

[1]Mi Won benzoin, GCA Chemical Corp., Bradenton, FL.
[2]Aerosil ™ R-972, Dimethyl Dichlorosilane treated fumed silica with approximately 70% of the surface hydroxyls are methylated Degussa Corp., Parsippany, NJ.
[3]Resiflow ™ PL 200, except Resiflow ™ PW 155 in Eg. 2, Estron Chemical, Calvert City, KY.
[4]Tinuvin ™ 928, except Tinuvin ™ 900 in Eg. 2, Ciba Specialty Chemicals, Tarrytown, NY.
[5]Epikote ™ GT 1003, Hexion Specialty Chemicals, Columbus, OH.

Application:

The coating powders were applied to:

Wheel Sections in Examples 1 to 5

Non-chrome self-assembled monolayer (Gardobond™ X-4707 X-4661, Chemetall, Frankfurt a.M., DE) pre-treated, machined aluminum alloy (Ford spoke 7M2J-1007-AA (AlSi7Mgwa)) wheel sections comprised of aluminum doped with from 6.5 to 7.5% silicon, from 0.25 to 0.45 wt. % Mg, less than 0.10 wt. % Fe, less than 0.03 wt. % Cu; from 0.06 to 0.07 wt. % Zn, 0.14 wt. % Ti, and 0.02 wt. % Mn. Ford Motor Company, Dearborn, Mich.

Panels in Examples 1 to 5

Gardobond™ X-4707 X-4661 pre-treated, 10.16 cm×15.24 cm (4"×6") AA6016 aluminum panels, available from Chemetall, Frankfurt a.M., DE. The coatings were cured for 15 minutes to achieve a substrate surface temperature of 190.6° C. (375° F.) to give coatings having thicknesses of 50-75 μm.

TABLE 3

Results

| Test | 1 COMP | 2 | 3 | 4 | 5 |
|---|---|---|---|---|---|
| | | Example | | | |
| Film Thickness (wheel section) | 70-120 μm | 70-120 μm | 70-110 μm | 70-120 μm | 70-120 μm |
| MEK (50 dbr) (panel) | 4 | 5 | 5 | 5 | 5 |
| Craze Cracking (panel) | pass | pass | pass | pass | pass |
| Crosshatch ASTM (panel) | 5B | 5B | 5B | 5B | 5B |
| Crosshatch After Recoat @ 4-5 mils (panel) | 5B | 5B | 5B | 5B | 5B |
| Chemical Testing - Reference Fuel B (panel) | 0 (no effect) | 0 (no effect) | 0 (no effect) | 0 (no effect) | 0 (no effect) |
| Chemical Testing - Washer Fluid (panel) | 0 (no effect) | 0 (no effect) | 0 (no effect) | 0 (no effect) | 0 (no effect) |
| Filiform (wheel section): Max. creepage (mm) | 5.75 | 2.95 | 2.8 | 2.2 | 2.15 |

TABLE 3-continued

Results

| Test | Example | | | | |
|---|---|---|---|---|---|
| | 1 COMP | 2 | 3 | 4 | 5 |
| Filiform (wheel section): Avg. creepage (mm) | 1.0 | 0.12 | 0.6 | 0.4 | 0.3 |
| PCI Smoothness (panel) | 8 | 8 | 8 | 8 | 8 |
| QUV-B on panel (Gloss Retention %/Δe) | 63%/2.1 | 79%/1.4 | | | |

As shown in Table 3, above the coating powders of the present invention in Examples 2, 3, 4 and 5 retain the appearance properties of conventional commercial epoxy functional acrylic copolymer powder coatings in Example 1. In addition, Example 2 shows that a polymer mixture of two epoxy functional acrylic copolymers comprising 12 wt. % vinyl aromatic monomer iv) and only 2.95 wt. % of hydrophobic acrylic monomer ii) provides much improved filiform corrosion resistance in comparison to Example 1 while retaining the chemical resistance properties of Example 1 and slightly improving QUV-B weatherability. Finally, in comparison to Example 4, the use of an epoxy adhesion promoter in Example 5 leads to improved filiform corrosion resistance in coatings made from epoxy functional acrylic copolymer components having 12 wt. % of hydrophobic acrylic monomer ii).

TABLE 4

CASS Results on Wheel Sections

| Example | Film Thickness (μm) | Max. creepage (mm) | Average creepage [mm] | Chip before/after CASS (TL239-VW: max. K2.0 before) |
|---|---|---|---|---|
| 1 | 85-115 | 1.0 | 0.15 | K1.5/K2.0 |
| 2 | 70-105 | 2.0 | 0.35 | K2.0/K2.0 |
| 3 | 80-130 | 1.2 | 0.25 | K2.0/K2.0-2.5 |
| 4 | 95-115 | 2.0 | 0.60 | K2.0/K2.0-2.5 |
| 5 | 80-110 | 1.8 | 0.30 | K2.0/K2.0-2.5 |

In all sections no edge corrosion was observed. The results of CASS testing in show that the inventive powder coatings retain the chip resistance of the conventional comparative coating of Example 1. In addition, Examples 2 and 3 show that copolymer mixtures comprising, respectively, 2.95 wt. % and 6 wt. % of the copolymerized hydrophobic acrylic monomer ii) and, respectively, 12 wt. % and 8.5 wt. % of the copolymerized vinyl aromatic monomer iv), based on the total weight of copolymerized monomers in all of the copolymers in the mixture, exhibit the best combination of chip resistance and CASS corrosion resistance.

What is claimed is:

1. A coating powder composition that provides a clear coat or tinted clear coat powder coating comprising an epoxy functional acrylic copolymer component that is one epoxy functional acrylic copolymer or a mixture of two or more copolymers, the epoxy functional acrylic copolymer component having a Tg of from 40° C. to 90° C. and comprising, as copolymerized monomers, i) from 10 to 28 wt. % of one or more epoxy functional unsaturated monomer; ii) from 6.0 wt. % to 13 wt. % of one or more hydrophobic acrylic monomer that has a mass solubility in water of 3.5 g/L or less and which would itself form a homopolymer having a glass transition temperature (Tg) of 50° C. to 175° C., and iii) the remainder of one or more nonionic comonomer that differs from hydrophobic acrylic monomer ii), each monomer wt. % based on the total weight of copolymerized monomers in the epoxy functional acrylic copolymer component;
one or more crosslinker for the acrylic copolymer; and,
wherein, when the epoxy functional acrylic copolymer component comprises one epoxy functional acrylic copolymer, the coating powder further comprises one or more adjuvant chosen from a hydrophobic submicron particle, an adhesion promoter, a light stabilizer, and an ultraviolet (UV) absorber.

2. The coating powder as claimed in claim 1, wherein the one or more hydrophobic acrylic monomer ii) comprises a bicycloalkyl(meth)acrylate.

3. The coating powder as claimed in claim 1, wherein the one or more crosslinker is an organic dicarboxylic acid or anhydride, or an adduct thereof with a polyester or a polyisocyanate.

4. The coating powder as claimed in claim 1, wherein the epoxy functional acrylic copolymer component comprises copolymer or copolymer mixture having 12 wt. % or less of a vinyl aromatic monomer iv), based on the total weight of copolymerized monomers in the epoxy functional acrylic copolymer component.

5. The coating powder as claimed in claim 1, further comprising one or more adhesion promoter.

6. The coating powder as claimed in claim 1, wherein the epoxy functional acrylic copolymer component comprises a copolymer mixture of one or more epoxy functional acrylic copolymer with one or more second copolymer, and wherein the second copolymer is an epoxy functional acrylic copolymer further comprising in copolymerized form up to 30 wt. %, one or more vinyl aromatic monomer iv), based on the total weight of the copolymerized monomers in the epoxy functional acrylic copolymer.

7. The coating powder as claimed in claim 1, wherein the epoxy functional acrylic copolymer component comprises a copolymer mixture of one or more epoxy functional acrylic copolymer with one or more second copolymer that is substantially free from copolymerized hydrophobic acrylic monomer (ii).

8. The coating powder as claimed in claim 7, wherein the one or more epoxy functional acrylic copolymer mixed with the second copolymer is substantially free from copolymerized vinyl aromatic monomer (iv).

9. A coating on a metal substrate made from the coating powder comprising an epoxy functional acrylic copolymer component that is one epoxy functional acrylic copolymer or a mixture of two or more copolymers, the epoxy functional acrylic copolymer component having a Tg of from 40° C. to 90° C. and comprising, as copolymerized monomers, i) from 10 to 28 wt. % of one or more epoxy functional unsaturated monomer, e.g. glycidyl (meth)acrylate; ii) from 6.0 wt. % to 13 wt. % of one or more hydrophobic acrylic monomer that has a mass solubility in water of 3.5 g/L or less and which would itself form a homopolymer having a glass transition temperature (Tg) of 50° C. to 175° C., and iii) the remainder of one or more nonionic comonomer that differs from hydrophobic acrylic monomer ii), each monomer wt. % based on the total weight of copolymerized monomers in the epoxy functional acrylic copolymer component;

one or more crosslinker for the thermosetting acrylic copolymer; and, wherein, when the epoxy functional acrylic copolymer component comprises one epoxy functional acrylic copolymer, the coating powder further comprises one or more adjuvant chosen from a hydrophobic submicron particle, an adhesion promoter, a light stabilizer, and an ultraviolet (UV) absorber.

10. A coating as claimed in claim 9, wherein the metal is aluminum or a forged alloy.

11. The coating of claim 9, wherein the one or more epoxy functional unsaturated monomer comprises glycidyl (meth) acrylate.

12. A coating powder composition that provides a clear coat or tinted clear coat powder coating comprising an epoxy functional acrylic copolymer component that is one epoxy functional acrylic copolymer or a mixture of two or more copolymers, the epoxy functional acrylic copolymer component having a Tg of from 40° C. to 90° C. and comprising, as copolymerized monomers, i) from 10 to 28 wt. % of one or more epoxy functional unsaturated monomer; ii) from 2.0 wt. % to 13 wt. % of one or more hydrophobic acrylic monomer that has a mass solubility in water of 3.5 g/L or less and which would itself form a homopolymer having a glass transition temperature (Tg) of 50° C. to 175° C., and iii) the remainder of one or more nonionic comonomer that differs from hydrophobic acrylic monomer ii), each monomer wt. % based on the total weight of copolymerized monomers in the epoxy functional acrylic copolymer component;

one or more crosslinker for the acrylic copolymer; and, wherein, when the epoxy functional acrylic copolymer component comprises one epoxy functional acrylic copolymer, the coating powder further comprises one or more adjuvant chosen from a hydrophobic submicron particle, an adhesion promoter, a light stabilizer, and an ultraviolet (UV) absorber, and wherein the epoxy functional acrylic copolymer is formed by either organic solvent polymerization or aqueous emulsion polymerization.

13. A coating on a metal substrate made from the coating powder comprising an epoxy functional acrylic copolymer component that is one epoxy functional acrylic copolymer or a mixture of two or more copolymers, the epoxy functional acrylic copolymer component having a Tg of from 40° C. to 90° C. and comprising, as copolymerized monomers, i) from 10 to 28 wt. % of one or more epoxy functional unsaturated monomer, e.g. glycidyl (meth)acrylate; ii) from 2.0 wt. % to 13 wt. % of one or more hydrophobic acrylic monomer that has a mass solubility in water of 3.5 g/L or less and which would itself form a homopolymer having a glass transition temperature (Tg) of 50° C. to 175° C., and iii) the remainder of one or more nonionic comonomer that differs from hydrophobic acrylic monomer ii), each monomer wt. % based on the total weight of copolymerized monomers in the epoxy functional acrylic copolymer component;

one or more crosslinker for the thermosetting acrylic copolymer; and, wherein, when the epoxy functional acrylic copolymer component comprises one epoxy functional acrylic copolymer, the coating powder further comprises one or more adjuvant chosen from a hydrophobic submicron particle, an adhesion promoter, a light stabilizer, and an ultraviolet (UV) absorber, and wherein the epoxy functional acrylic copolymer is formed by either organic solvent polymerization or aqueous emulsion polymerization.

* * * * *